US011645741B2

(12) United States Patent
Park et al.

(10) Patent No.: US 11,645,741 B2
(45) Date of Patent: May 9, 2023

(54) IMAGE PROCESSING METHOD AND ELECTRONIC DEVICE SUPPORTING SAME

(71) Applicant: Samsung Electronics Co., Ltd., Gyeonggi-do (KR)

(72) Inventors: Jaehyoung Park, Gyeonggi-do (KR); Hyungsok Yeo, Gyeonggi-do (KR); Yongjae Lee, Gyeonggi-do (KR); Junyoung Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 47 days.

(21) Appl. No.: 17/294,920

(22) PCT Filed: Nov. 27, 2019

(86) PCT No.: PCT/KR2019/016409
§ 371 (c)(1),
(2) Date: May 18, 2021

(87) PCT Pub. No.: WO2020/111750
PCT Pub. Date: Jun. 4, 2020

(65) Prior Publication Data
US 2022/0005169 A1 Jan. 6, 2022

(30) Foreign Application Priority Data
Nov. 29, 2018 (KR) .................. 10-2018-0150793

(51) Int. Cl.
*G06T 5/50* (2006.01)
*G06T 7/33* (2017.01)
(Continued)

(52) U.S. Cl.
CPC .............. *G06T 5/50* (2013.01); *G06T 7/33* (2017.01); *H04N 5/265* (2013.01); *H04N 23/71* (2023.01);
(Continued)

(58) Field of Classification Search
None
See application file for complete search history.

(56) References Cited

U.S. PATENT DOCUMENTS 7,489,345 B2  2/2009  Fukumoto
7,764,319 B2  7/2010  Fukumoto
(Continued)

FOREIGN PATENT DOCUMENTS

JP  2004-343177  12/2004
JP  2017-143390  8/2017
(Continued)

OTHER PUBLICATIONS

PCT/ISA/210 Search Report issued on PCT/KR2019/016409, dated Mar. 25, 2020, pp. 5.
(Continued)

*Primary Examiner* — James M Hannett
(74) *Attorney, Agent, or Firm* — The Farrell Law Firm, P.C.

(57) ABSTRACT

Disclosed is an electronic device which a camera, a memory, and a processor that is operatively connected with the camera and the memory. The processor performs photographing on an external object multiple times depending on a second exposure time shorter than a specified first exposure time by using the camera, obtains a first image set including a plurality of first images depending on the multiple photographing, composes the first image set to generate a second image, identifies a specific area around at least one light source corresponding to a light source included in the second image, and generates a third image where an image effect associated with the light source is added to the specific area, by using the second image. Moreover, various embodiment found through the present disclosure are possible.

12 Claims, 14 Drawing Sheets

(51) Int. Cl.
  *H04N 5/265* (2006.01)
  *H04N 23/71* (2023.01)
  *H04N 23/73* (2023.01)
  *H04N 23/743* (2023.01)

(52) U.S. Cl.
  CPC ........... *H04N 23/73* (2023.01); *H04N 23/743* (2023.01); *G06T 2207/10144* (2013.01); *G06T 2207/20221* (2013.01)

(56) References Cited

U.S. PATENT DOCUMENTS

| | | |
|---|---|---|
| 9,686,537 B2 | 6/2017 | Geiss et al. |
| 9,749,551 B2 | 8/2017 | Geiss et al. |
| 9,794,529 B2 | 10/2017 | Lee et al. |
| 10,306,141 B2 | 5/2019 | Ishii |
| 10,334,176 B2 | 6/2019 | Katagawa |
| 10,382,712 B1 * | 8/2019 | Forutanpour .......... H04N 5/217 |
| 10,506,175 B2 | 12/2019 | Park et al. |
| 2004/0105027 A1 | 6/2004 | Kawamura et al. |
| 2012/0287307 A1 * | 11/2012 | Oyama ................... G06T 5/008 348/E9.053 |
| 2015/0244923 A1 * | 8/2015 | Lee ................... H04N 5/35554 348/234 |
| 2017/0318233 A1 | 11/2017 | Geiss et al. |
| 2018/0089874 A1 * | 3/2018 | Wu ....................... G06T 15/506 |
| 2018/0098001 A1 | 4/2018 | Park et al. |
| 2020/0143519 A1 * | 5/2020 | Gordon ................ H04N 5/2351 |

FOREIGN PATENT DOCUMENTS

| | | |
|---|---|---|
| JP | 2017-216638 | 12/2017 |
| KR | 10-2015-0099263 | 8/2015 |
| KR | 10-2018-0036463 | 4/2018 |
| WO | WO-2005101309 A1 * | 10/2005 ............. G06T 5/008 |

OTHER PUBLICATIONS

PCT/ISA/237 Written Opinion issued on PCT/KR2019/016409, dated Mar. 25, 2020, pp. 6.
Korean Office Action dated Nov. 21, 2022 issued in counterpart application No. 10-2018-0150793, 17 pages.

* cited by examiner

IMAGE PROCESSING METHOD AND ELECTRONIC DEVICE SUPPORTING SAME

PRIORITY

This application is a National Phase Entry of PCT International Application No. PCT/KR2019/016409, which was filed on Nov. 27, 2019, and claims priority to Korean Patent Application No. 10-2018-0150793, which was filed on Nov. 29, 2018, the entire content of each of which is incorporated herein by reference.

TECHNICAL FIELD

Embodiments of the disclosure relate to a technology for processing an image.

BACKGROUND ART

Various types of photographing devices (or imaging devices) such as a DSLR, a mirror-less digital camera, and the like are being released. Also, an electronic device such as a smartphone, a tablet PC, or the like includes a camera module and provides a function of photographing a picture or a video. The electronic device (or photographing device) may provide various photographing modes, and a user may select a photographing mode depending on a photographing environment and may photograph a desired image.

A lens of the photographing device has a function of focusing an incident light. The most basic function of the lens is a light focusing function, but the lens makes it possible to diversify an expression technique of a picture. An out-focusing technique, an apodization filter, or a star effect is a representative example of the expression technique. Because the photographing device uses an angular aperture formed of a plurality of parts, the star effect may be automatically implemented through light diffraction in photographing. However, because a camera module of the electronic device uses an aperture different from that of the photographing device, the star effect may not be automatically implemented.

DISCLOSURE

Technical Problem

In the case of giving an optical effect (e.g., a star effect) to a spot light (or a point source/point light source), a photographing device may apply the optical effect based on an optical property. As such, in a camera of a smartphone that has difficulty in using a lens or sensor capable of giving various effects including the effect, it may be difficult to apply the effect. Nowadays, there is an attempt to artificially give an optical effect to an image only in image processing. However, in the case of artificially giving an optical effect to an image through image processing, because image processing is performed based on an image in which a haze phenomenon (e.g., diffraction, flare, and the like caused by an aperture and a lens part) is included, the artificial star effect that is given through the image processing may have a difference with a real star effect that is based on an optical property of a photographing device.

Various embodiments of the disclosure provide an electronic device outputting a final image, to which an optical effect (e.g., a star effect) is applied, by using one or more images.

Various embodiments of the disclosure provide an electronic device outputting a final image, which does not include a haze phenomenon and to which an optical effect (e.g., a star effect) is applied, by using a plurality of images (hereinafter referred to as "short exposure images") having an exposure time shorter than a normal exposure time when a light measuring unit provided at a camera measures a light.

Various embodiments of the disclosure provide an electronic device outputting a final image, which does not include a haze phenomenon and to which an optical effect (e.g., a star effect) is applied, by using a short exposure image and a normal exposure image.

Technical Solution

An electronic device according to an embodiment of the disclosure may include a camera, a memory, and a processor that is operatively connected with the camera and the memory. The processor may perform photographing on an external object multiple times depending on a second exposure time shorter than a specified first exposure time by using the camera, may obtain a first image set including a plurality of first images depending on the multiple photographing, may compose the first image set to generate a second image, may identify a specific area around at least one light source corresponding to a light source included in the second image, and may generate a third image where an image effect associated with the light source is added to the specific area, by using the second image.

Also, an electronic device according to an embodiment of the disclosure may include a camera, a memory, and a processor that is operatively connected with the camera and the memory. The processor may obtain a first image associated with an external object depending on a first exposure time and may obtain a second image associated with the external object depending on a second exposure time shorter than the first exposure time, by using the camera. The processor may identify a specific area around at least one light source corresponding to a light source, based on the second image, and may generate a third image by composing at least a portion of the first image and at least a portion of the second image in a partial area of the specific area with a ratio different from that of any other partial area thereof, by using the first image and the second image.

Advantageous Effects

According to embodiments of the disclosure, a final image to which an optical effect (e.g., a star effect) is applied may be output by using one or more images.

According to various embodiments of the disclosure, a final image, which does not include a haze phenomenon and to which an optical effect (e.g., a star effect) is applied, may be output by using a plurality of short exposure images.

According to various embodiments of the disclosure, a final image, which does not include a haze phenomenon and to which an optical effect (e.g., a star effect) is applied, may be output by using a short exposure image and a normal exposure image.

Besides, a variety of effects directly or indirectly understood through this disclosure may be provided.

With regard to description of drawings, the same or similar components will be marked by the same or similar reference signs.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
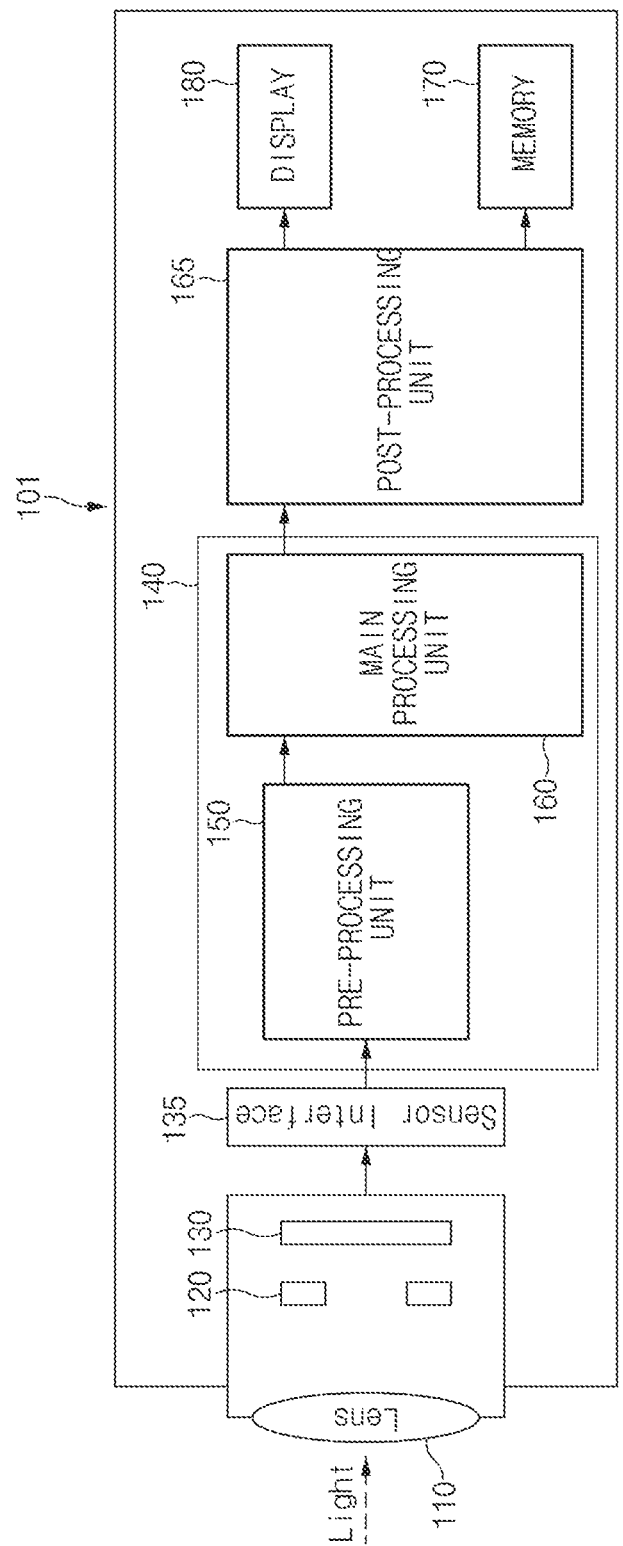
FIG. 1 is a configuration diagram of an electronic device according to an embodiment of the disclosure.

FIG. 1 is a configuration diagram of an electronic device according to an embodiment of the disclosure.

Referring to FIG. 1, an electronic device 101 may be a device that collects a light reflected from an external subject to photograph a picture or a video. The electronic device 101 may include a lens part 110, a shutter part 120, an image sensor 130, a sensor interface 135, an image processing unit 140, a post-processing unit 165, a memory 170, and a display 180.

According to an embodiment, the lens part 110 may collect a light that arrives at a device from a subject. An image may be formed on the image sensor 130 by the collected light.

According to an embodiment, the shutter part 120 may adjust the amount of light exposed to the image sensor 130 through slit driving. For example, the shutter part 120 may be implemented with a shutter having a mechanical shape or may be implemented with an electronic shutter through a control of a sensor. For another example, the shutter part 120 may be a shutter in which only a last film (or a front shutter film) is electronically implemented.

According to an embodiment, the image sensor 130 may convert a light into electronic image data by using a photoelectric conversion effect. The image data may be transferred to the image processing unit 140 through the sensor interface 135. The image sensor 130 may include a group of pixels that are arranged two-dimensionally, and each pixel may convert a light into electronic image data.

According to an embodiment, the image sensor 130 may adjust the amount of light arriving at the image sensor 130 (or the amount of light exposed thereto) by adjusting the shutter part 120 with an exposure time determined at the image processing unit 140. For example, the image sensor 130 may further include a mechanical structure functioning as a variable aperture that adjusts a light amount before a light for image formation arrives at. The image sensor 130 may read out electronic image data according to the photoelectric conversion effect, which are recorded at each pixel (read-out).

According to an embodiment, the sensor interface 135 may perform an interface between the image sensor 130 and the image processing unit 140. For example, the sensor interface 135 may be located in front of or behind a pre-processing unit 150 depending on the configuration of the electronic device 101.

According to an embodiment, through various processing operations, the image processing unit 140 may output image data collected by the image sensor 130 to the display 180 or may store the collected image data in the memory 170. For example, the image processing unit 140 may include the pre-processing unit 150 and a main processing unit 160.

According to an embodiment, the pre-processing unit (e.g., Pre ISP (Image Signal Processor)) 150 may perform a function, such as image registration, gamma processing, or the like, before image processing is performed by the main processing unit (e.g., an image processing unit) 160. For example, in the case where there is blurring between a plurality of images photographed continuously, the pre-processing unit 150 may remove or reduce a blurring component through the image registration process.

According to an embodiment, the main processing unit 160 (e.g., an application processor (AP), ISP, or a peripheral controller) may perform digital signal processing on an image signal processed through the pre-processing unit 150. After the whole image signal is generated by correcting and composing signals received from the pre-processing unit 150, the main processing unit 160 may allow the display 180 to display the whole image signal thus generated. The main processing unit 160 may perform a function of controlling overall operations such as signal amplification, signal conversion, signal processing, and the like.

According to various embodiments, the main processing unit 160 may calculate a location and brightness of a light source included in an image and may apply a light effect (or an image effect) (e.g., a star effect) so as to center around a point where each light source is located. The main processing unit 160 may calculate a location and real brightness of a light source by using one short exposure image or a plurality of images having different exposures. Additional information associated with an operation of the main processing unit 160 will be provided through FIGS. 3 to 13.

According to an embodiment, the post-processing unit 165 may perform additional image processing on an image received from the main processing unit 160. For example, the post-processing unit 165 may perform follow-up processing using a color, or image processing such as face detection or subject tracking.

According to an embodiment, the post-processing unit 165 may store an image signal provided from the main processing unit 160 in the memory 170 or may display the image signal in the display 180. For example, the post-processing unit 165 may convert an image signal into a format that the memory 170 or the display 180 supports, so as to be transferred thereto.

According to an embodiment, the memory 170 may store an image processed through the image processing unit 140. The display 180 may output image data processed by the image processing unit 140 so as to be checked by a user.

Figure 2:
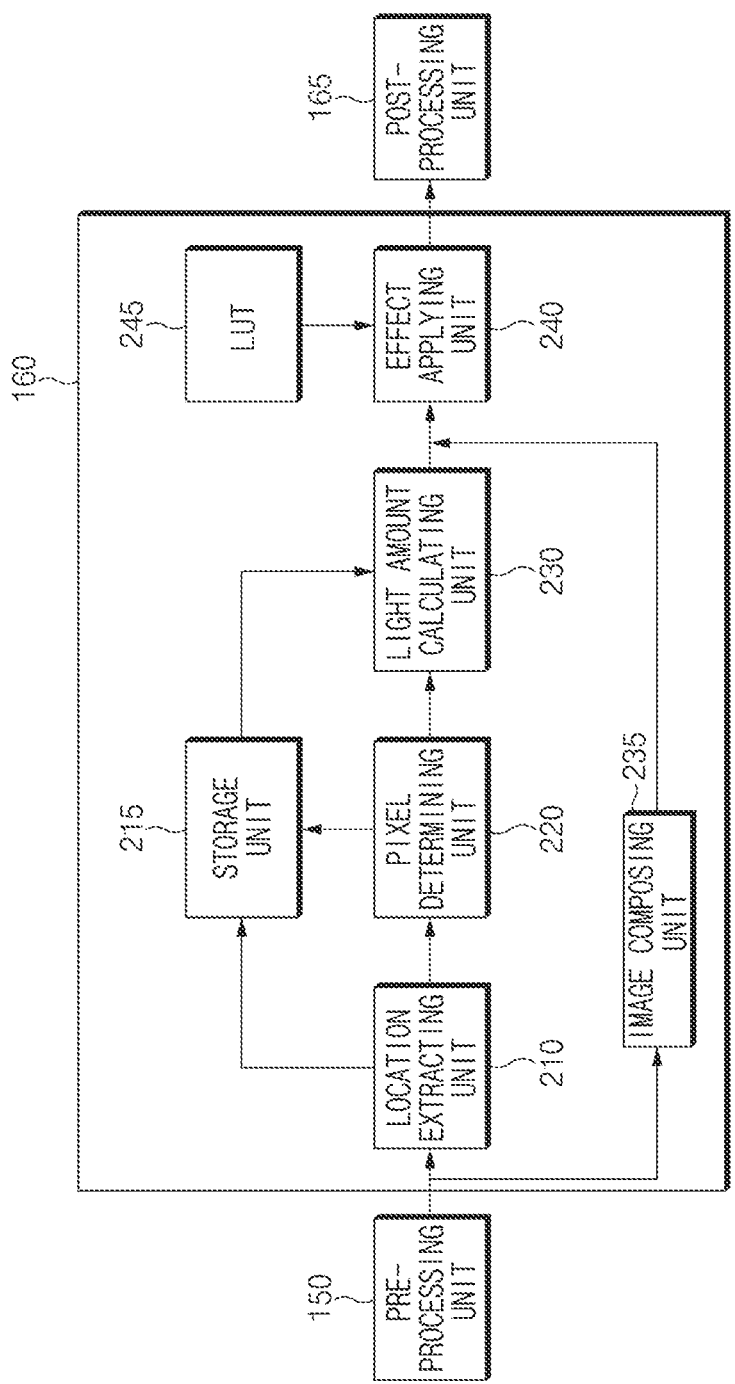
FIG. 2 is a block diagram illustrating a configuration of a main processing unit according to an embodiment of the disclosure.

FIG. 2 is a block diagram illustrating a configuration of a main processing unit according to an embodiment of the disclosure. Components of FIG. 2 may be classified depending on functions, and some of the components may be omitted or may be integrated.

Referring to FIG. 2, the main processing unit 160 may receive data of one image from the pre-processing unit 150 or may receive data of a plurality of images that are photographed continuously (or within a specified time period).

According to an embodiment, in the case where the main processing unit 160 receives data of a plurality of images, the main processing unit 160 may receive the data of the plurality of images having different exposure times.

For example, the main processing unit 160 may receive a normal exposure image photographed depending on a normal exposure time (or a reference exposure time) (e.g., a user setting exposure time or an automatic setting exposure time) (e.g., 1/16s) and a short exposure image photographed depending on an exposure time shorter than the normal exposure time. The main processing unit 160 may analyze a light source by using the normal exposure image and the short exposure image and may apply various effects (e.g., a star effect) to the normal exposure image stored as the final result. Below, the description will be focused on the case of using one normal exposure image and one short exposure image, not limited thereto. For example, it may be possible to analyze a light source by using one image or to analyze a light source by using three or more sheets of images.

According to an embodiment, in the case where, for photographing, the user pushes a shutter or performs any other user interface (e.g., a gesture, a voice, or the like) corresponding to pushing the shutter, a normal exposure image and a short exposure image may be sequentially photographed. In various embodiments, in the case where blurring is present between the normal exposure image and the short exposure image, image registration may be executed by the pre-processing unit 150, and result images (e.g., a normal exposure image and a short exposure image mutually registered) may be transferred to the main processing unit 160.

According to an embodiment, the normal exposure image and the short exposure image may have different exposure times and may be images in which a star (or light burst) does not occur at a light source (i.e., a saturated point). For example, the short exposure image may be first input to the main processing unit 160, and the normal exposure image may be then input to the main processing unit 160. Alternatively, the normal exposure image may be first input to the main processing unit 160, and the short exposure image may be then input to the main processing unit 160. For reduction in shutter lag, the electronic device 101 may wait in a state of in advance storing a short exposure image or a normal exposure image.

According to an embodiment, the main processing unit 160 may include a location extracting unit 210, a storage unit 215, a pixel determining unit 220, a light amount calculating unit 230, an image composing unit 235, an effect applying unit 240, and a lookup table 245. The above classification is made depending on functions. Some of the components may be combined, or an additional component may be included therein.

According to an embodiment, the location extracting unit 210 may determine a light area in a normal exposure image and a short exposure image. For example, the location extracting unit 210 may identify a point having brightness of a specified value or more. With regard to the short exposure image, the location extracting unit 210 may determine start and end coordinates and a pixel gain of a pixel having brightness of a value or more set for each readout line of the image sensor 130, so as to be stored in the storage unit 215. In various embodiments, to detect and filter a pixel, the value of which temporarily changes due to a threshold value by a noise, the location extracting unit 210 may apply a hysteresis so as to be stored in the storage unit 215 when being continuous as much as a specified count or more. According to various embodiments, the location extracting unit 210 may determine a size of the light area based on the normal exposure image.

According to an embodiment, the pixel determining unit 220 may determine a saturation pixel. The pixel determining unit 220 may determine a saturation pixel for each readout line of the short exposure image. Start and end coordinate information of a line unit may be stored in the memory 170 with respect to the determine saturation pixel.

According to an embodiment, the light amount calculating unit 230 may calculate a real light amount of a light source, based on a location of a spot light (or a point source/point light source) in an image detected by the location extracting unit 210 and the coordinate information of the saturation pixel determined by the pixel determining unit 220. For example, the light amount calculating unit 230 may calculate a light amount of a light source in the normal exposure image. In the case where computation is simultaneously made in the normal exposure image and the short exposure image, the light amount calculating unit 230 may apply an exposure difference (e.g., 16 times) and may compute a light amount of a light source with reference to a light amount of an unsaturated adjacent pixel around a saturated pixel (refer to FIG. 5).

According to an embodiment, the image composing unit 235 may compose at least one short exposure image and at least one normal exposure image to generate a composite image. For example, the image composing unit 235 may generate a composite image by utilizing information (e.g., a location of a light source, a size of the light source, or a pixel value of each pixel) about a light source in a short exposure image or a normal exposure image, which is determined by the location extracting unit 210, the pixel determining unit 220, and the light amount calculating unit 230.

According to an embodiment, the image composing unit 235 may compose a plurality of short exposure images. For example, the image composing unit 235 may receive short exposure images having a specific exposure ratio as compared with a normal exposure image. The image composing unit 235 may compose the short exposure images to generate a composite image. Brightness of a light source in the composite image may be the same as or similar to brightness of a light source in the normal exposure image. A size of the light source in the composite image may be the same as or similar to that in the short exposure images. The size of the light source in the composite image may be the same as or similar to a size of a light source that is obtained by removing a haze phenomenon from the light source of the normal exposure image. The image composing unit 235 may remove a haze phenomenon due to a nonlinear factor from a composite image by composing a plurality of short exposure images. In various embodiments, the image composing unit 235 may temporarily store the composite image in the storage unit 215. Alternatively, the image composing unit 235 may transfer the composite image to the effect applying unit 240.

According to various embodiments, the image composing unit 235 may compose a normal exposure image and a short exposure image at different ratios with respect to a light area (or a composition range). For example, a size of a composition range may be determined by the location extracting unit 210. The image composing unit 235 may compose a normal exposure image and a short exposure image at different ratios depending on a distance from a light source center within a composition range. For example, the image composing unit 235 may determine a composition ratio such that a composition ratio of a short exposure image is greater than a composition ratio of a normal exposure image at a light source center or may determine a composition ratio such that a composition ratio of a normal exposure image is greater than a composition ratio of a short exposure image as a distance from the light source center increases. The image composing unit 235 may generate a composite image by composing a normal exposure image and a short exposure image at different ratios within a composition range. In various embodiments, a distance (e.g., a composition range) in which a short exposure image and a normal exposure image are composed may change for each light source.

According to various embodiments, the image composing unit 235 may determine a composition ratio of a short exposure image and a normal exposure image depending on an ambient color and brightness of each light source of the normal exposure image. For example, when a surrounding area of a light source is dark (e.g., in a situation where illuminance is less than a specified value), the image composing unit 235 may decrease the composition ratio of the short exposure image relatively greatly (e.g., compared to a situation where ambient illuminance of the light source is the specified value or more) as a distance from a light source center increases. On the other hand, when a surrounding area of a light source is not relatively dark (e.g., in a situation where illuminance is the specified value or more), the image composing unit 235 may decrease the composition ratio of the short exposure image relatively small (e.g., compared to a situation where ambient illuminance of the light source is less than the specified value) as a distance from a light source center increases.

According to various embodiments, ambient brightness of a light source may be set to a minimum value of brightness in a composition range. For example, when ambient brightness of a light source has a specific value (e.g., when a pixel value is 100), the image composing unit 235 may set (or adjust) a pixel value at a maximum distance of a composition range from a light source center to the specific value. Also, the image composing unit 235 may set (or adjust) pixels within the composition range so as to have a pixel value of the specific value or more.

According to an embodiment, the effect applying unit 240 may apply an effect based on the calculated light amount.

With reference to the lookup table 245, the effect applying unit 240 may apply a light effect (e.g., a star effect) by tracking a light amount and replacing a saturation pixel or a specified area, in which the saturation pixel is centered, depending on a ratio corresponding to the tracked light amount. The effect applying unit 240 may be configured in the form of replacing a specified area (e.g., a composition range) in a composite image received from the image composing unit 235.

According to various embodiments, with reference to the lookup table 245, the effect applying unit 240 may replace a specified area (e.g., a composition range) of a composite image to apply a light effect (e.g., a star effect). Accordingly, the effect applying unit 240 may generate a final image which is free from a haze phenomenon and to which a light effect is applied.

According to an embodiment, the lookup table 245 may store information about a light effect (e.g., a star effect) in the form of a table. Additional information about the lookup table 245 may be given with reference to FIG. 6.

According to various embodiments, the main processing unit 160 may track a light amount of a spot light (or a point light source) by using one sheet of short exposure image. In this case, the location extracting unit 210 may not perform a separate function; when a saturation pixel of a short exposure image is determined by the pixel determining unit 220, the location extracting unit 210 may calculate a light amount of a saturation pixel portion with reference to a value of an unsaturated adjacent pixel around the saturation pixel. When a normal exposure image is received, the main processing unit 160 may replace the saturation pixel portion. The main processing unit 160 may output image data to which the light effect is applied.

According to an embodiment, the post-processing unit 165 may store an image signal provided from the main processing unit 160 in the memory 170 or may display the image signal in the display 180. For example, the post-processing unit 165 may convert an image signal into a format that the memory 170 or the display 180 supports, so as to be transferred thereto.

Figure 3:
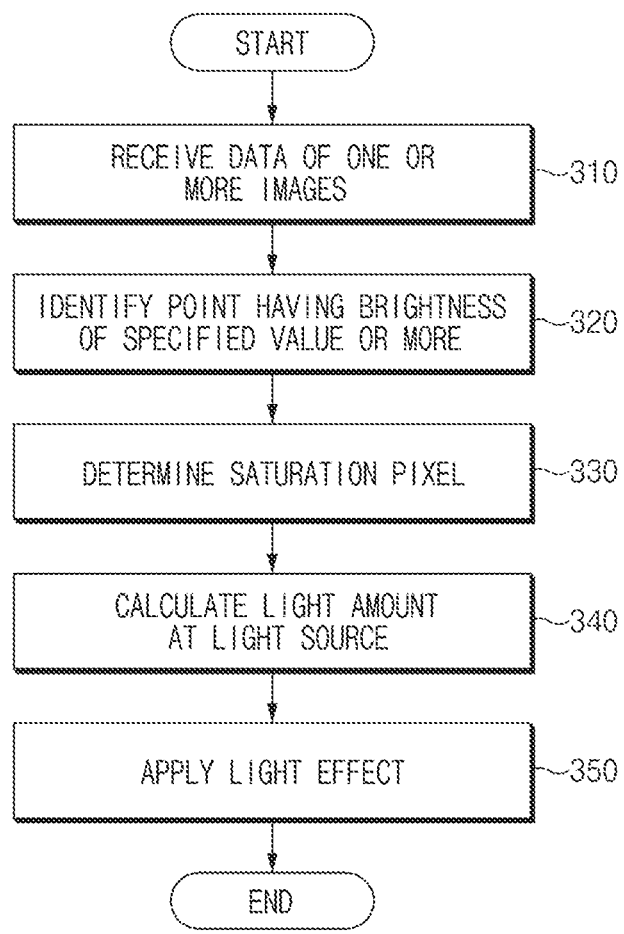
FIG. 3 is a flowchart illustrating an image processing method according to an embodiment of the disclosure.
Figure 4:
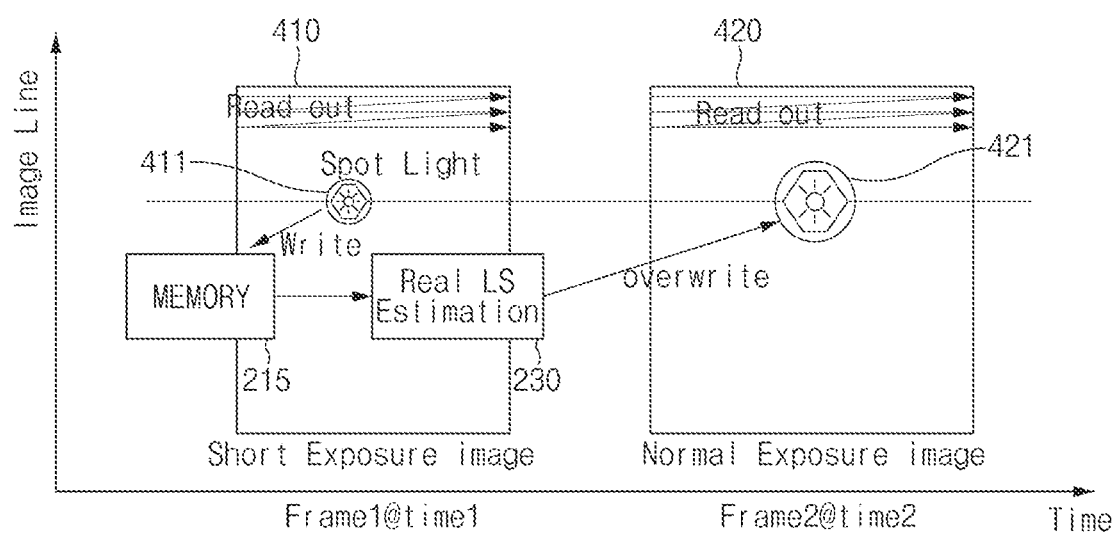
FIG. 4 is a timing signal diagram illustrating a method for extracting a spot light by using a short exposure image and a normal exposure image, according to an embodiment of the disclosure.

FIG. 3 is a flowchart illustrating an image processing method according to an embodiment of the disclosure. FIG. 4 is a timing signal diagram illustrating a method for extracting a spot light by using a short exposure image and a normal exposure image, according to an embodiment of the disclosure.

Referring to FIGS. 2 to 4, the main processing unit 160 may receive one or more images (e.g., a short exposure image and a normal exposure image) and may output an image to which a light effect (e.g., a star effect) is applied.

According to an embodiment, in operation 310, the location extracting unit 210 of the main processing unit 160 may receive one or more image data from the pre-processing unit 150. For example, the location extracting unit 210 may receive a short exposure image 410 and a normal exposure image 420. When an exposure ratio of the normal exposure image 420 and the short exposure image 410 is "N" and an exposure time of the short exposure image 410 is "t", an exposure time of the normal exposure image 420 may be "N*t". According to various embodiments, the short exposure image 410 and the normal exposure image 420 may be photographed at a specific F value depending on an external illuminance environment. The specific F value may be changed depending on performance of a camera (e.g., the electronic device 101).

According to an embodiment, in operation 320, the location extracting unit 210 of the main processing unit 160 may identify a point having brightness of a specified value or more by using the short exposure image 410. For example, the location extracting unit 210 may store start and end coordinates and a pixel gain of a pixel of brightness of a preset value or more in the memory 215.

According to an embodiment, in operation 330, the pixel determining unit 220 of the main processing unit 160 may determine a saturation pixel by using the short exposure image 410. For example, the pixel determining unit 220 may store start and end coordinate information of a line unit in the storage unit 215 with respect to the determined saturation pixel.

According to an embodiment, in operation 340, the light amount calculating unit 230 of the main processing unit 160 may calculate a light amount of a light source subject, based on a location of the detected light source and the coordinate information of the saturation pixel. For example, the light amount calculating unit 230 may extract a real light amount of a saturated portion through a linear fitting operation, by using an unsaturated adjacent pixel.

According to various embodiments, the image sensor 130 may read out a brightness value of each pixel (read-out). Coordinates and a brightness value of a spot light 411 may be extracted from the short exposure image 410, and the extracted coordinates and brightness value may be stored in the storage unit 215. The light amount calculating unit 230 may identify adjacent pixels of a pre-saturation state, which are around a pixel saturated by the spot light 411. The light amount calculating unit 230 may extract a real light amount of a saturated portion through the linear fitting operation. Two adjacent pixels that are not saturated may be required to perform the linear fitting operation. The two adjacent pixels may be obtained by using a surrounding value of the saturation pixel of the short exposure image 410, may be obtained by using the short exposure image 410 and the normal exposure image 420, or may be obtained by using only the normal exposure image 420. A light amount measuring method may be given in detail with reference to FIG. 5.

According to an embodiment, in operation 350, the effect applying unit 240 of the main processing unit 160 may apply a light effect (e.g., a star effect) with reference to the lookup table 245. For example, the effect applying unit 240 may replace a saturation pixel portion of the normal exposure image 420.

Figure 5:
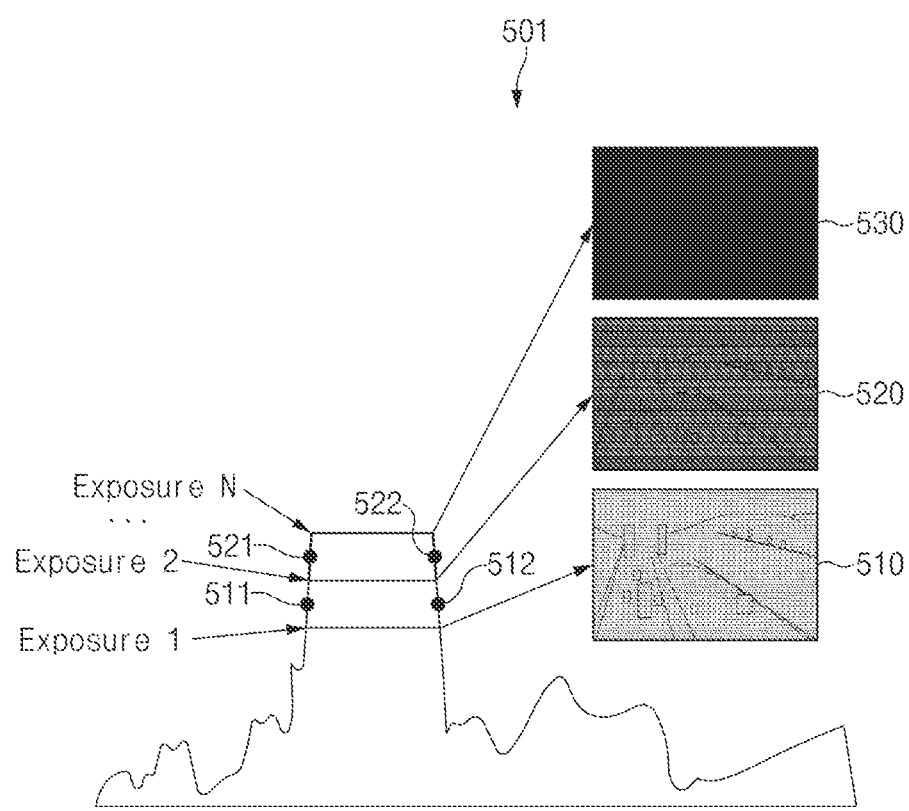
FIG. 5 is a graph illustrating a method for tracking a light amount by using a plurality of images having different exposures, according to an embodiment of the disclosure.

FIG. 5 is a graph illustrating a method for tracking a light amount by using a plurality of images having different exposures, according to an embodiment of the disclosure.

Referring to FIGS. 2 and 5, the light amount calculating unit 230 may calculate a real light amount of a saturated portion through the linear fitting operation. The light amount calculating unit 230 may estimate a light amount value of an actually saturated area by using a surrounding value of a saturation pixel. As such, even though the number of times of photographing of a short exposure image does not increase, the light amount of the saturated area may be estimated.

According to an embodiment, in the case of using N sheets of images having different exposure times, the light amount calculating unit 230 may calculate a light amount of a saturated portion by using an N-th image 530 having the shortest exposure time from among the N sheets of images.

According to an embodiment, in the case of multiplying an exposure ratio coefficient with a normal exposure image (e.g., a first image 510 or Exposure 1) and the N-th image 530 together, most of the remaining portion other than a spot light or a saturated portion may have values coinciding with each other. Because the N-th image 530 is a short exposure image, the quality of image of an unsaturated portion may be reduced as compared to a normal exposure image, and it may act as a noise (e.g., removed in filtering) depending on the capability of a sensor and an exposure ratio. On the other hand, the N-th image 530 may have a value of a relatively high accuracy around a saturation pixel.

In reading out a short exposure image (e.g., the N-th image 530), it may be possible to obtain a first slope value by performing the linear fitting operation on two pixels 511 and 512 before saturation and to obtain a second slope value by performing the linear fitting operation on two pixels 521 and 522 after saturation. In various embodiments, the light amount calculating unit 230 may calculate a light amount at a saturation pixel by using a small value of the first slope value and the second slope value.

According to various embodiments, because a pixel saturated in a normal exposure image (e.g., the first image 510) may not be saturated in a short exposure image (e.g., the N-th image 530), in this case, a light amount at a light source may be calculated by using a pixel value of the short exposure image.

According to various embodiments, in the case where a light amount of a light source extracted from the whole image is small or great even though a value is obtained through the linear fitting operation, the light amount calculating unit 230 may correct a portion of the light amount by introducing a global variable or a local variable of the whole image. In this case, a high-quality image in which a relative ratio of the light amounts of saturation spot lights is uniformly maintained may be obtained.

Figure 6:
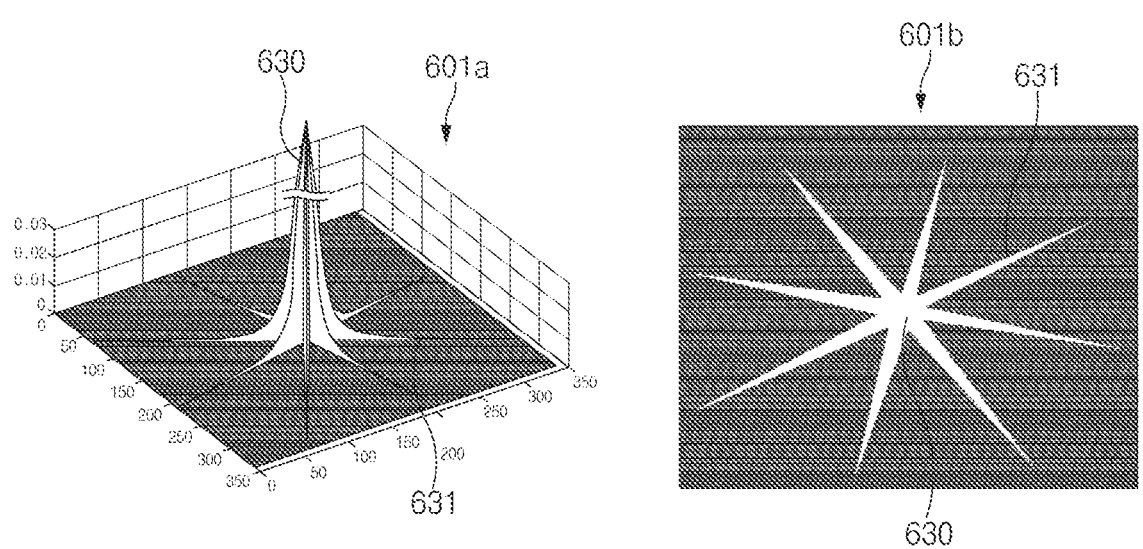
FIG. 6 is a diagram illustrating a graph corresponding to a lookup table for applying a light effect, according to an embodiment of the disclosure.

FIG. 6 is a diagram illustrating a graph corresponding to a lookup table for applying a light effect, according to an embodiment of the disclosure.

Referring to FIGS. 2 and 6, a lookup table (e.g., the lookup table 245) may store graphs 601a and 601b associated with a light effect (e.g., a star effect). The lookup table may store numerical values marked at the graphs 601a and 601b in the form of a table.

According to an embodiment, the graphs 601a and 601b indicate a star point spread function (PSF). A magnitude of the star PSF may change depending on brightness of a spot light. A star (or light burst) phenomenon may appear by diffraction and may change depending on brightness of a light source. The star PSF may be in the shape in which a gain sharply decreases as a distance from a center 630 increases. A size (or a length) of a blade 631 of the star may be viewed as if the size changes, by limiting a gain to a saturation level or less depending on brightness of a spot light extracted in a previous phase. Because a gain is the greatest at the center 630 in the graph 601a, an intermediate value of the gain is omitted.

Figure 7:
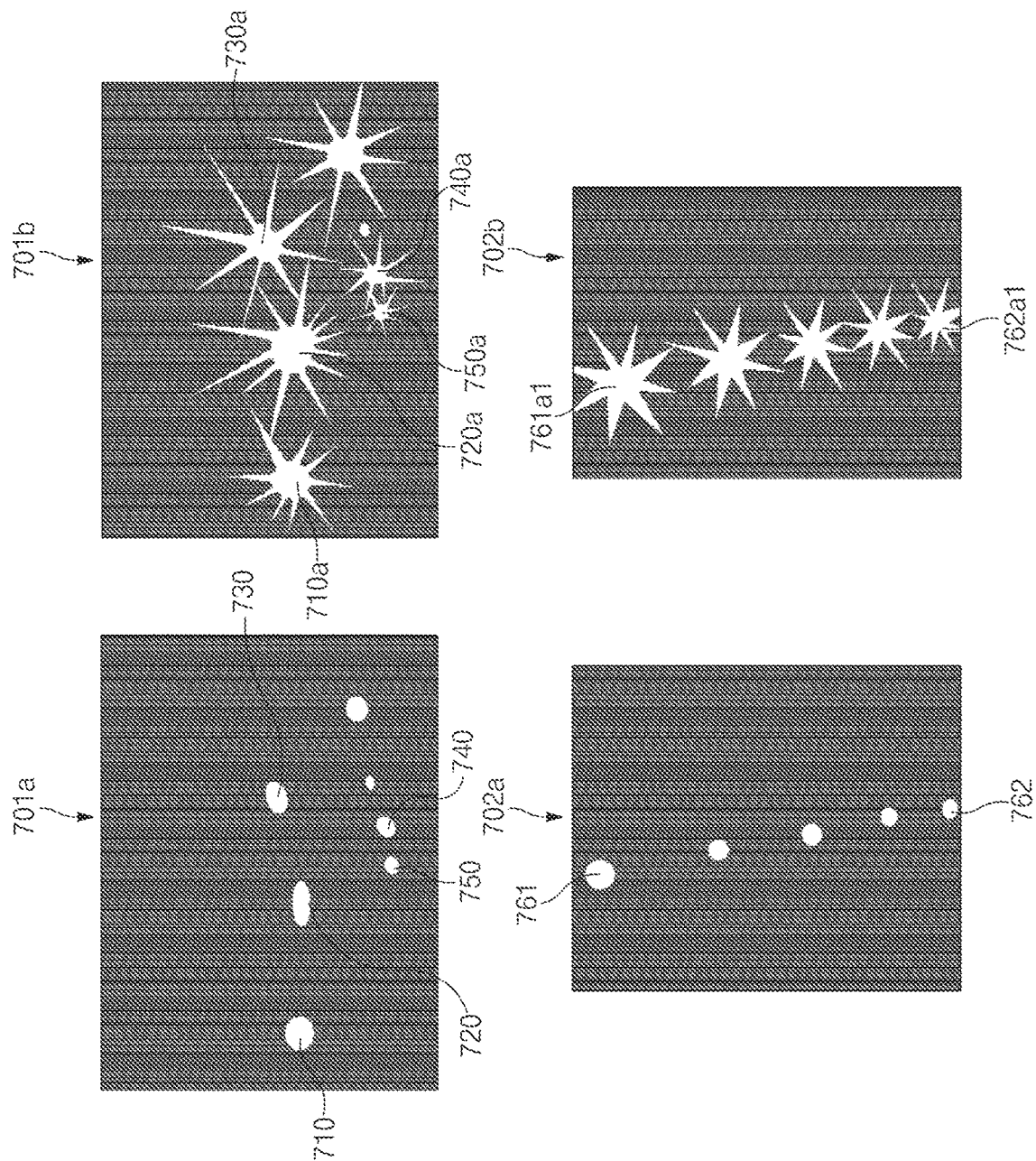
FIG. 7 is a diagram illustrating an example image to which a star effect according to an embodiment of the disclosure is applied.

FIG. 7 is a diagram illustrating an example image to which a star effect according to an embodiment of the disclosure is applied.

Referring to FIG. 7, before a star effect is applied, in the case where spot lights 710 to 750 are included in a first image 701a, each of the spot lights 710 to 750 may be output in a saturated state, and a star effect may not appear. Also, even though there is a difference between light amounts of spot lights, the spot lights may not be distinguishable from each other on the first image 701a.

According to an embodiment, after the star effect is applied, in a second image 701b, spot lights 710a to 750a may be displayed in a star shape. A length of a blade of a star may change depending on a magnitude of a tracked light amount of each spot light.

According to an embodiment, a main processing unit (e.g., the main processing unit 160) may calculate a light amount of a saturated pixel by using unsaturated adjacent pixels around the saturated pixel, at each spot light. The main processing unit may replace a spot light portion in a star shape with reference to a lookup table (e.g., the lookup table 245), depending on the magnitude of the light amount thus calculated.

According to various embodiments, the main processing unit may determine a size of a blade of a star depending on brightness of a spot light, and an effect applying unit (e.g., the effect applying unit 240) may give a star effect by replacing a PSF shape depending on the intensity of the extracted spot light. Because a star is based on the PSF where a brightness value decreases as it goes toward a periphery, in the case of replacing an estimated intensity so as to be proportional to a PSF center value, a size of a blade of a star may be smoothly adjusted by saturation level clipping of an image format.

According to an embodiment, before a star effect is applied, in the case where spot lights 761 and 762 are included in a first image 702a, each spot light may be output in a saturated state, and a star effect may not appear. After a star effect is applied, in a second image 702b, spot lights 761a and 762a may be displayed in a star shape. A length of a blade of a star may change depending on a magnitude of a light amount of each spot light.

According to various embodiments, the main processing unit may obtain color information from a normal exposure image among a short exposure image and the normal exposure image and may not perform a separate spot light extracting operation for each color. In the case of a Bayer pattern, after a representative color is selected from R, G, and B color information and a light amount of one light source is calculated, in a final image, an existing spot light may be replaced with a star PSF depending on a color ratio of a normal exposure.

Figure 8:
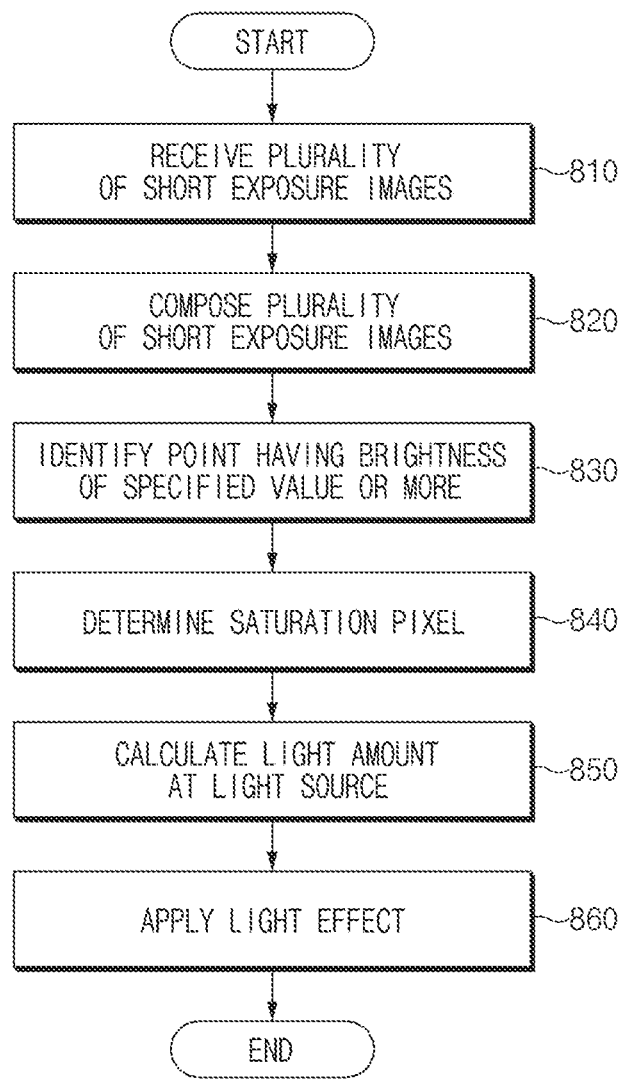
FIG. 8 is a flowchart illustrating an image processing method according to various embodiments of the disclosure.
Figure 9:
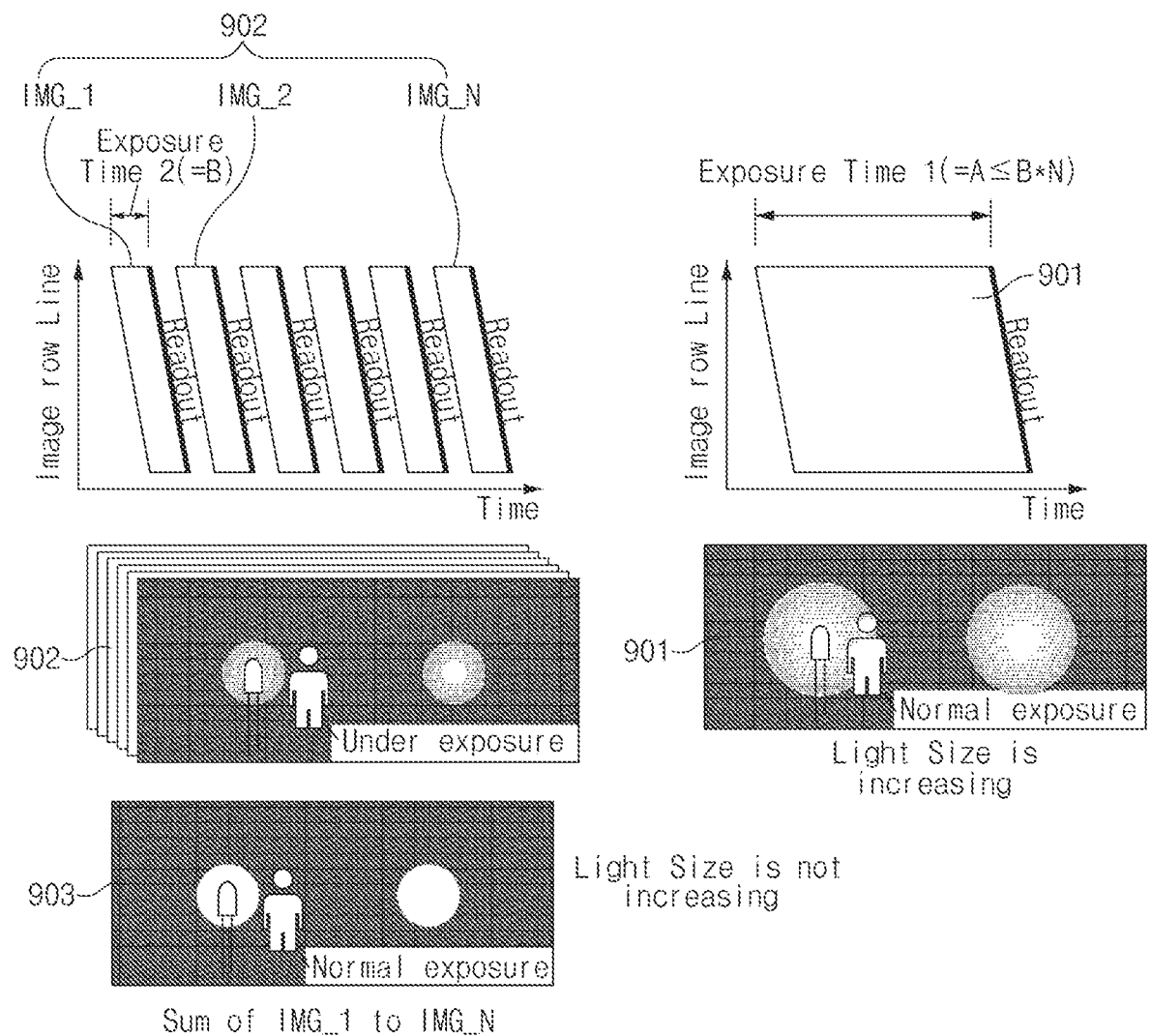
FIG. 9 is a diagram illustrating a method for processing a haze phenomenon by using a plurality of short exposure images, according to various embodiments of the disclosure.

FIG. 8 is a flowchart illustrating an image processing method according to various embodiments of the disclosure. FIG. 9 is a diagram illustrating a method for processing a haze phenomenon by using a plurality of short exposure images, according to various embodiments of the disclosure.

Referring to FIGS. 2, 8, and 9, the main processing unit 160 may process a haze phenomenon by using a plurality of short exposure images 902. For example, the main processing unit 160 may compose the plurality of short exposure images 902 such that there decreases a haze phenomenon due to a nonlinear factor increasing a haze that sharply decreases as a magnitude of a light amount decreases. In the case where an exposure time decreases in image photographing, a ratio of a factor nonlinearly saturated may also decrease. Accordingly, a haze phenomenon due to a nonlinear factor may decrease by decreasing an exposure time.

According to an embodiment, in the case where an exposure ratio of a normal exposure image 901 and each of short exposure images IMG_1 to IMG_N is "N" and an exposure time (e.g., Exposure Time 1) of the normal exposure image 901 is "A", an exposure time (e.g., Exposure Time 2) of each of the short exposure images IMG_1 to IMG_N may be set to "B". For example, an exposure time of each of the short exposure images IMG_1 to IMG_N may be determined such that "B*N" is the same as "A". In various embodiments, in the case where an increase in a readout noise is expected, an exposure time of each of the short exposure images IMG_1 to IMG_N may be determined such that "B*N" is greater than "A". In various embodiments, exposure times of the short exposure images IMG_1 to IMG_N may be differently set.

According to an embodiment, a light amount of each of the short exposure images IMG_1 to IMG_N may be smaller than a light amount of the normal exposure image 901. Because a light source of the normal exposure image 901 includes a haze phenomenon due to a nonlinear factor, a size of a light source in each of the short exposure images IMG_1 to IMG_N may be smaller than a size of the light source in the normal exposure image 901.

According to an embodiment, in operation 810, the main processing unit 160 may receive the plurality of short exposure images 902. For example, the main processing unit 160 may sequentially receive the short exposure images IMG_1 to IMG_N from the pre-processing unit 150. Exposure times of the short exposure images IMG_1 to IMG_N may be set the same. Alternatively, exposure times of the short exposure images IMG_1 to IMG_N may be set to be different. A sum of the exposure times of the short exposure images IMG_1 to IMG_N may be set to be the same as the exposure time of the normal exposure image 901. Alternatively, the sum of the exposure times of the short exposure images IMG_1 to IMG_N may be set to be greater than the exposure time of the normal exposure image 901. In various embodiments, the main processing unit 160 may temporarily store the received short exposure images IMG_1 to IMG_N in the storage unit 215.

According to an embodiment, in operation 820, the main processing unit 160 may compose the plurality of short exposure images 902. For example, the image composing unit 235 may compose the short exposure images IMG_1 to IMG_N to generate a composite image 903. Brightness of the composite image 903 may be the same as or similar to brightness of the normal exposure image 901. A size of a light source in the composite image 903 may be the same as or similar to that in the short exposure images IMG_1 to IMG_N. The size of the light source in the composite image 903 may be the same as or similar to a size of a light source that is obtained by removing a haze phenomenon from the light source of the normal exposure image 901. In various embodiments, the image composing unit 235 may temporarily store the composite image 903 in the storage unit 215.

Operation 830 to operation 860 may be performed the same as or similar to operation 320 to operation 350 in FIG. 3. Accordingly, the description associated with operation 830 to operation 860 duplicated with operation 320 to operation 350 of FIG. 3 is omitted.

According to an embodiment, in operation 830 to operation 850, the main processing unit 160 may determine a saturation pixel by using one of the short exposure images IMG_1 to IMG_N and may calculate a light amount at a light source.

According to an embodiment, in operation 860, the main processing unit 160 may apply a light effect (e.g., a star effect) to the composite image 903 with reference to the lookup table 245. For example, the effect applying unit 240 may replace a saturation pixel portion of a composite image with a light source image to which a star effect is applied. Accordingly, the effect applying unit 240 may generate a final image by applying a light effect where a haze phenomenon is removed.

Figure 10:
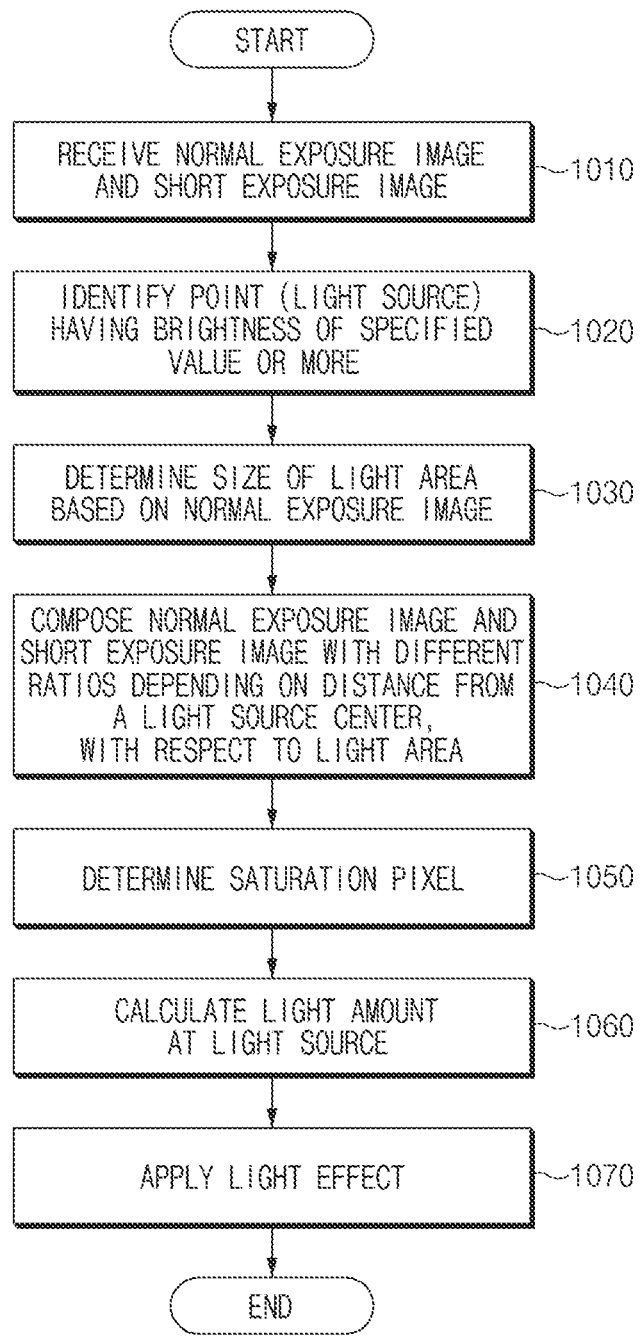
FIG. 10 is a flowchart illustrating an image processing method according to various embodiments of the disclosure.
Figure 11:
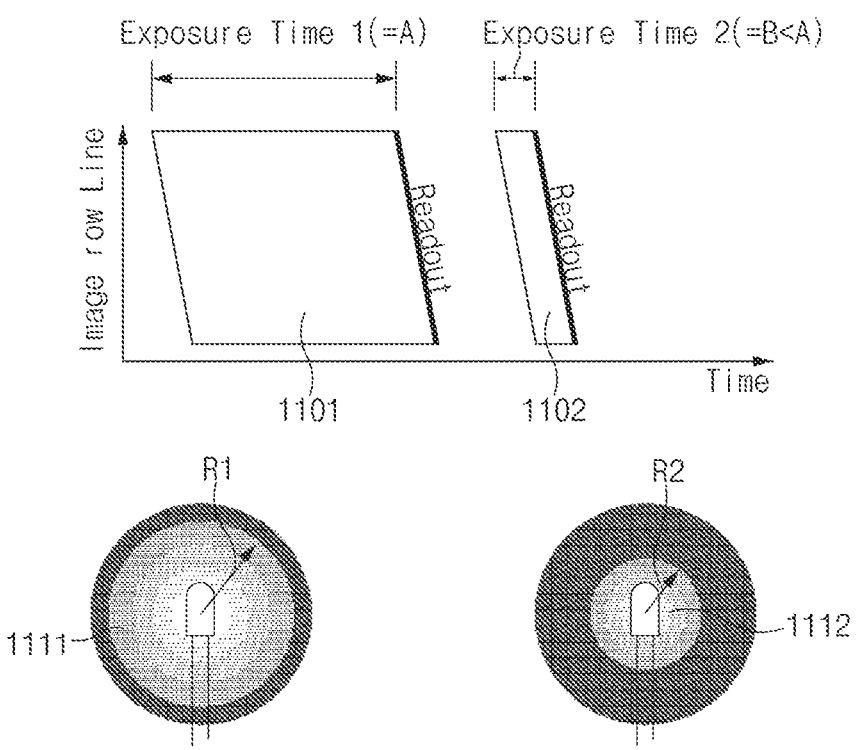
FIG. 11 is a diagram illustrating a method for processing a haze phenomenon by using a normal exposure image and a short exposure image, according to various embodiments of the disclosure.
Figure 12:
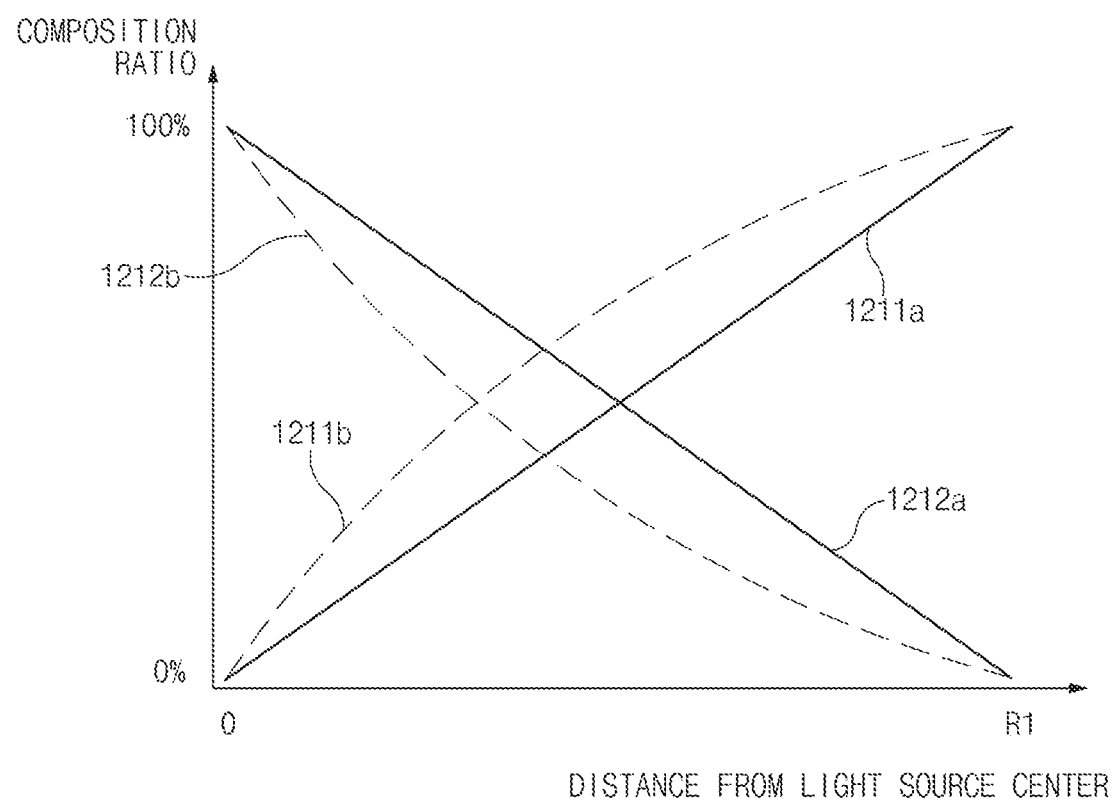
FIG. 12 is a graph illustrating a composition ratio of a normal exposure image and a short exposure image in a haze phenomenon processing method according to an embodiment of the disclosure. 1261

FIG. 10 is a flowchart illustrating an image processing method according to various embodiments of the disclosure. FIG. 11 is a diagram illustrating a method for processing a haze phenomenon by using a normal exposure image and a short exposure image, according to various embodiments of the disclosure. FIG. 12 is a graph illustrating a composition ratio of a normal exposure image and a short exposure image in a haze phenomenon processing method according to an embodiment of the disclosure.

Referring to FIGS. 2 and 10 to 12, the main processing unit 160 may compose portions of a normal exposure image 1101 and of a short exposure image 1102 with different ratios and may apply a light effect (e.g., a star effect) to a composite image. For example, because the number of factors increasing in proportion to brightness of a light amount causing a haze phenomenon increases depending on the number of images to be composed, there is a limitation in removing a haze phenomenon due to a linear factor by using the method for composing a plurality of short exposure images, which is described with reference to FIG. 8. In the case of composing the normal exposure image 1101 and the short exposure image 1102 with different ratios radially from a light source center, a haze phenomenon due to a linear factor may decrease.

According to an embodiment, in operation 1010, the main processing unit 160 may receive the normal exposure image 1101 and the short exposure image 1102 from the pre-processing unit 150. For example, the normal exposure image 1101 may be photographed by using a first exposure time "A" (e.g., Exposure Time 1). The short exposure image 1102 may be photographed by using a second exposure time "B" (e.g., Exposure Time 2). The second exposure time "B" may be set to be smaller than the first exposure time "A" (B<A).

According to various embodiments, a light source 1111 included in the normal exposure image 1101 may be expressed by a circle having a first radius R1. A light source 1112 included in the short exposure image 1102 may be expressed by a circle having a second radius R2.

According to an embodiment, in operation 1020, the main processing unit 160 may identify a point (e.g., a light source) having brightness of a specified value or more by using the short exposure image 1102. For example, start and end coordinates and a pixel gain of a pixel of brightness of a preset value or more may be stored in storage unit 215. The location extracting unit 210 may identify a light source center.

According to an embodiment, in operation 1030, the main processing unit 160 may determine a size of a light area based on the normal exposure image 1101. For example, the location extracting unit 210 may determine the first radius R1 of the normal exposure image 1101 as the size of the light area. The location extracting unit 210 may set an area corresponding to the circle having the first radius R1 from the light source center to the light area (or a composition range).

According to an embodiment, in operation 1040, the main processing unit 160 may compose the normal exposure image 1101 and the short exposure image 1102 with different ratios depending on a distance from the light source center, with respect to the light area. For example, a composition ratio of the normal exposure image 1101 and the short exposure image 1102 may be changed as a distance from the light source center increases. As a distance from the light source center increases, the image composing unit 235 may increase a composition ratio of the normal exposure image 1101 from 0% to 100%. As a distance from the light source center increases, the image composing unit 235 may decrease a composition ratio of the short exposure image 1102 from 100% to 0%. A distance from the light source center may be changed from "0" to the first radius R1 of the normal exposure image 1101. The image composing unit 235 may generate a composite image by composing the normal exposure image 1101 and the short exposure image 1102 with different ratios with respect to the light area.

According to various embodiments, because a composition ratio of the short exposure image 1102 is high at the light source center, brightness of a composite image may be the same as or similar to brightness of the short exposure image 1102. Because a composition ratio of the normal exposure image 1101 becomes higher as a distance from the light source center increases, a size of a light source in the composite image may be the same as or similar to that of the normal exposure image 1101. The size of the light source in the composite image may be the same as or similar to a size of a light source that is obtained by removing a haze phenomenon from the light source of the normal exposure image 1101. The image composing unit 235 may temporarily store the composite image in the storage unit 215.

According to an embodiment, referring to FIG. 12, the image composing unit 235 may linearly change a composition ratio 1211a of the normal exposure image 1101 and a composition ratio 1212a of the short exposure image 1102 depending on a distance from the light source center. According to various embodiments, referring to FIG. 12, the image composing unit 235 may nonlinearly change a composition ratio 1211b of the normal exposure image 1101 and a composition ratio 1212b of the short exposure image 1102 depending on a distance from the light source center.

According to various embodiments, a composition ratio of the normal exposure image 1101 and the short exposure image 1102 may be changed based on a size of a light source or brightness of a subject around the light source. For example, as a size of a light source increases, a composition ratio of the short exposure image 1102 may decrease relatively small. Alternatively, as brightness of a subject around a light source becomes brighter, a composition ratio of the short exposure image 1102 may decrease relatively small.

According to various embodiments, a composition range (e.g., the first radius R1 of the normal exposure image 1101) may be variable depending on brightness of each light source and ambient brightness of a light source in the normal exposure image 1101. For example, a ratio of each exposure (e.g., a short exposure or a normal exposure) may be changed from 0 to 100% within the composition range (e.g., the first radius R1), but a final pixel value may be limited to any specific range. A composed pixel value may have a minimum value or a maximum value. For example, a minimum value may make reference to a pixel value around each light source.

According to an embodiment, in operation 1050, the main processing unit 160 may determine a saturation pixel by using the short exposure image 1102. For example, start and end coordinate information of a line unit may be stored in the storage unit 215 with respect to the determined saturation pixel.

According to an embodiment, in operation 1060, the main processing unit 160 may calculate a light amount of a light source subject, based on a location of the detected light source and the coordinate information of the saturation pixel. For example, the light amount calculating unit 230 may extract a real light amount of a saturated portion through the linear fitting operation by using an unsaturated adjacent pixel.

According to an embodiment, in operation 1070, the main processing unit 160 may apply a light effect (e.g., a star effect) with reference to the lookup table 245. For example, the effect applying unit 240 may replace a saturation pixel portion of the composite image with a light source image to which a star effect is applied. Accordingly, the effect applying unit 240 may generate a final image by applying a light effect where a haze phenomenon is removed.

Figure 13:
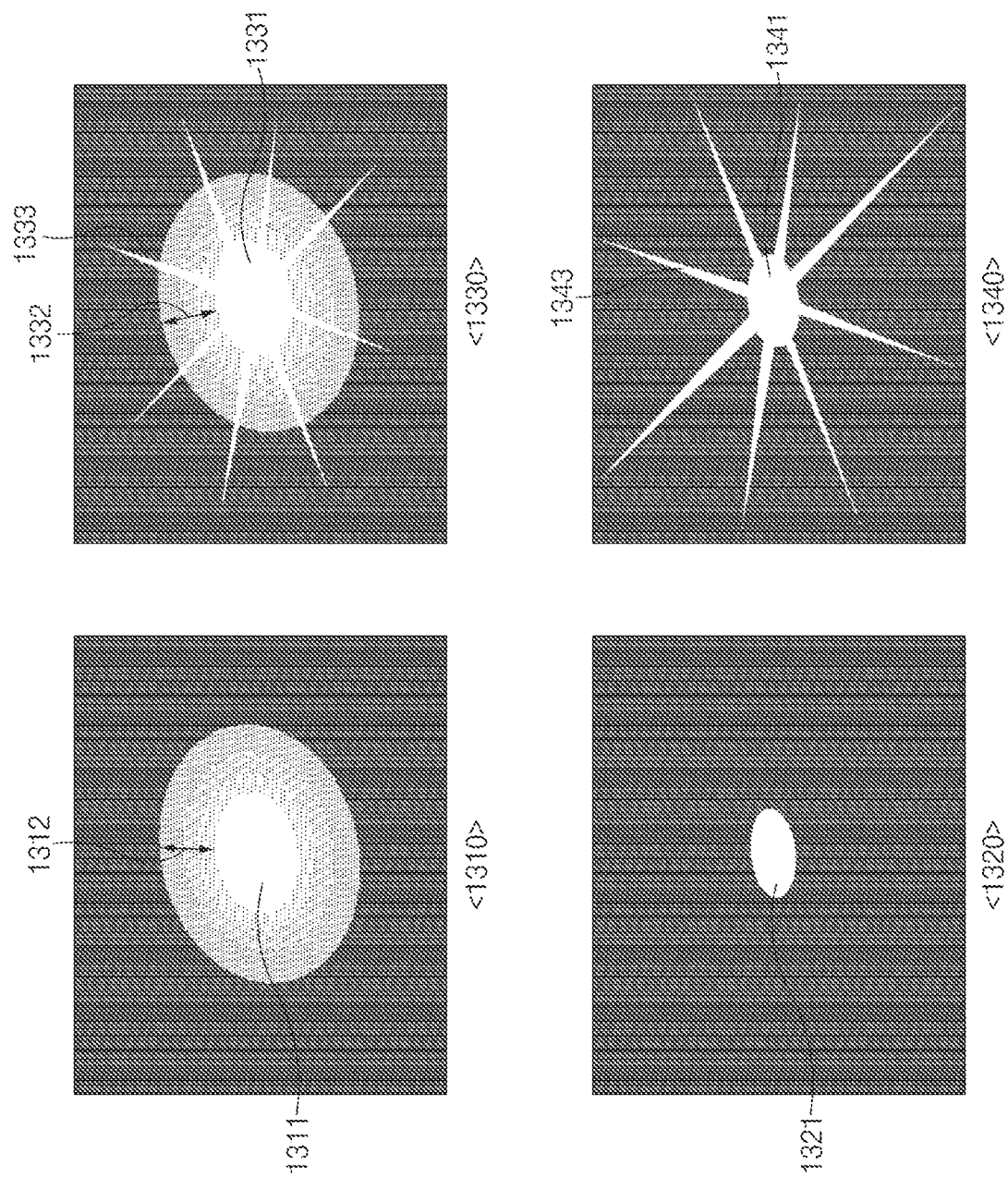
FIG. 13 is a diagram illustrating an image to which a star effect according to various embodiments of the disclosure is applied.

FIG. 13 is a diagram illustrating an image to which a star effect according to various embodiments of the disclosure is applied.

Referring to FIG. 13, before a star effect is applied, in a first image 1310, a spot light 1311 may be output in a state where a haze phenomenon 1312 is included therein, and a star effect may not appear.

According to an embodiment, in a second image 1320 before a star effect is applied, a spot light 1321 may be output in a state where the haze phenomenon 1312 is removed, by the image processing method of FIG. 8 or the image processing method of FIG. 10.

According to an embodiment, in a third image 1330 after a star effect is applied, a spot light 1331 may be output in a state where both a star phenomenon and a haze phenomenon 1332 are included therein. A length of a blade 1333 of a star may change depending on a magnitude of a light amount of the spot light 1331.

According to an embodiment, in a fourth image 1340 after a star effect is applied, a spot light 1341 may be displayed in a star shape where a haze phenomenon is removed. Accordingly, a star shape may be clearly displayed in the fourth image 1340, rather than the third image 1330. A length of a blade 1343 of a star may change depending on a magnitude of a light amount of the spot light 1341.

According to an embodiment, a main processing unit (e.g., the main processing unit 160) may calculate a light amount of a saturated pixel by using unsaturated adjacent pixels around the saturated pixel, at a spot light of a short exposure image (e.g., one of the plurality of short exposure images 902 of FIG. 9 or the short exposure image 1102 of FIG. 11). The main processing unit may replace a spot light portion in the shape of a star in a composite image (e.g., the composite image 903 of FIG. 9 or a composite image of FIG. 11) with reference to a lookup table (e.g., the lookup table 245), depending on the magnitude of the light amount thus calculated.

According to various embodiments, the main processing unit may determine a size of a blade of a star depending on brightness of a spot light, and an effect applying unit (e.g., the effect applying unit 240) may give a star effect by replacing a PSF shape depending on the intensity of the spot light thus extracted. Because a star is based on the PSF where a brightness value decreases as it goes toward a periphery, in the case of replacing an estimated intensity so as to be proportional to a PSF center value, a size of a blade of a star may be smoothly adjusted.

According to various embodiments, the main processing unit may obtain color information from a normal exposure image among a short exposure image and the normal exposure image and may not perform a separate spot light extracting operation for each color. In the case of a Bayer pattern, after a representative color is selected from R, G, and B color information and a light amount of one light source is calculated, in a final image, an existing spot light may be replaced with a star PSF depending on a color ratio of a normal exposure.

Figure 14:
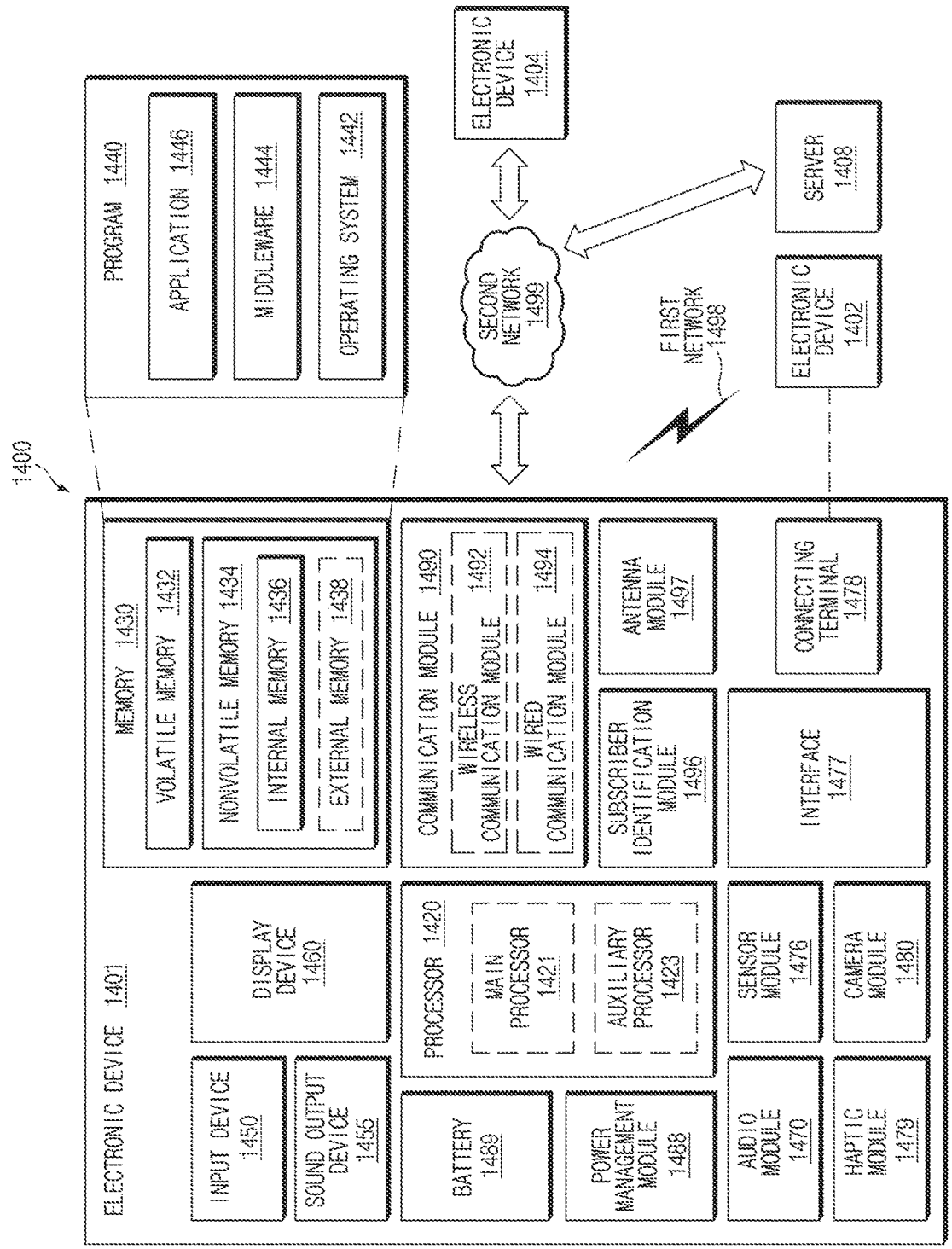
FIG. 14 is a block diagram illustrating an electronic device in a network environment according to various embodiments.

FIG. 14 is a block diagram illustrating an electronic device 1401 (e.g., the electronic device 101) in a network environment 1400 according to various embodiments. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420 (e.g., the main processing unit 140 and the post-processing unit 165), memory 1430 (e.g., the memory 170), an input device 1450, a sound output device 1455, a display device 1460, an audio module 1470, a sensor module 1476, an interface 1477, a haptic module 1479, a camera module 1480 (e.g., the lens part 110, the shutter part 120, and the image sensor 130), a power management module 1488, a battery 1489, a communication module 1490, a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, a keyboard, or a digital pen (e.g., a stylus pen).

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., PCB). According to an embodiment, the antenna module 1497 may include a plurality of antennas. In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to". "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 1430).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1430) in the form of a program module. The instruction, when executed by a processor (e.g., a processor 1420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

The invention claimed is:
1. An electronic device comprising:
a camera;
a memory; and
a processor operatively connected with the camera and the memory,
wherein the processor is configured to:
perform photographing on an external object multiple times depending on a second exposure time shorter than a specified first exposure time by using the camera;
obtain a first image set including a plurality of first images depending on the multiple photographing;
determine a saturation pixel through start and end coordinates and a pixel gain of a pixel having a preset value or more in one of the first images;
compose the first image set to generate a second image based on the saturation pixel;

identify a specific area around at least one light source corresponding to a light source included in the second image; and
generate a third image where an image effect associated with the light source is added to the specific area, by using the second image.

2. The electronic device of claim 1, wherein the processor is configured to:
store start and end coordinate information of a line unit with respect to the saturation pixel; and
determine a size of the specific area by using the coordinate information.

3. The electronic device of claim 2, wherein the processor is configured to:
in composing the first images,
determine the specific area in each of the first images by using the coordinate information and register the first images based on the specific area.

4. The electronic device of claim 1, wherein the first images include a plurality of light sources, and
wherein the processor is configured to:
differently specify a size of the specific area with respect to each of the plurality of light sources depending on a property of each of the plurality of light sources.

5. The electronic device of claim 2, wherein the processor is configured to:
calculate a light amount of a saturated portion through a fitting operation with an unsaturated adjacent pixel, based on a location of the light source and the coordinate information of the saturation pixel, by using the adjacent pixel.

6. The electronic device of claim 2, wherein the processor is configured to:
obtain a first slope value by performing a linear fitting operation on two pixels before the saturation pixel;
obtain a second slope value by performing the linear fitting operation on two pixels after the saturation pixel; and
calculate a light amount of the saturation pixel by using a small value among the first slope value and the second slope value.

7. The electronic device of claim 1, wherein the processor is configured to:
set a sum of exposure times of the first image set so as to be greater than or the same as the first exposure time.

8. An electronic device comprising:
a camera;
a memory; and
a processor operatively connected with the camera and the memory,
wherein the processor is configured to:
obtain a first image associated with an external object depending on a first exposure time and obtain a second image associated with the external object depending on a second exposure time shorter than the first exposure time, by using the camera;
identify a specific area around at least one light source corresponding to a light source, based on the second image;
determine pixel values in the specific area of the third image so as to have values between a first value and a second value greater than the first value; and
generate a third image by composing at least a portion of the first image and at least a portion of the second image in a partial area of the specific area with a ratio different from that of any other partial area thereof, by using the first image and the second image,
wherein the first value is a pixel value around the specific area.

9. The electronic device of claim 8, wherein the processor is configured to:
generate the third image where an image effect associated with the light source is added to correspond to the specific area.

10. The electronic device of claim 8, wherein the processor is configured to:
determine a size of the specific area based on the first image; and
change a composition ratio of the first image and the second image from a center of the light source to a maximum magnitude of an area of the light source.

11. The electronic device of claim 8, wherein the processor is configured to:
increase a composition ratio of the first image as a distance from a center of the light source increases and decrease a composition ratio of the second image as the distance from the center of the light source increases.

12. The electronic device of claim 8, wherein the processor is configured to:
specify the second value is a saturated pixel value of the light source.

* * * * *